(12) United States Patent
Calatayud et al.

(10) Patent No.: US 12,054,257 B2
(45) Date of Patent: Aug. 6, 2024

(54) FLEXIBLE PILLAR FOR A FLEXIBLE FRAME OF A VARIABLE GEOMETRY FLIGHT CONTROL SURFACE

(71) Applicant: Airbus Operations (S.A.S.), Toulouse (FR)

(72) Inventors: Cristobal Calatayud, Boulogne Billancourt (FR); Benjamin Trarieux, Toulouse (FR); Brice Albert, Toulouse (FR); Frédéric Goupil, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 31 days.

(21) Appl. No.: 17/992,489

(22) Filed: Nov. 22, 2022

(65) Prior Publication Data

US 2023/0159154 A1   May 25, 2023

(30) Foreign Application Priority Data

Nov. 24, 2021   (FR) ...................................... 2112448

(51) Int. Cl.
    *B64C 9/02*   (2006.01)
    *B64C 9/16*   (2006.01)
(52) U.S. Cl.
    CPC . *B64C 9/02* (2013.01); *B64C 9/16* (2013.01)
(58) Field of Classification Search
    CPC .... B64C 5/10; B64C 5/08; B64C 3/50; B64C 9/18; B64C 9/02; B64C 9/16
    See application file for complete search history.

(56) References Cited

U.S. PATENT DOCUMENTS

| | | | |
|---|---|---|---|
| 1,842,736 A | 1/1932 | Stout | |
| 5,222,699 A * | 6/1993 | Albach | ..................... B64C 3/48 |
| | | | 244/90 R |
| 5,887,828 A * | 3/1999 | Appa | ........................ B64C 9/18 |
| | | | 244/90 R |
| 6,152,405 A | 11/2000 | Mueller | |
| 6,276,641 B1 | 8/2001 | Daimler | |

(Continued)

OTHER PUBLICATIONS

Elmenhorst, "Lagern und Entkoppeln", May 1, 2022, http://www.elmenhorst.de/xchange/kataloge/katakog_lagern_entkoppeln_2020.pdf.

(Continued)

*Primary Examiner* — Tien Q Dinh
*Assistant Examiner* — William L Gmoser
(74) *Attorney, Agent, or Firm* — KDW Firm PLLC

(57) ABSTRACT

A flexible pillar for a variable geometry flight control surface including upper skin and lower skins includes an elongate shape elastic element having an and at least a first end and a second end. The flexible pillar can be disposed between the upper skin and the lower skin so the elastic element can be fixed to the upper skin at the first end of the flexible pillar and fixed to the lower skin at the second end of the flexible pillar. The flexible pillar has a rigidity along the longitudinal axis of the flexible pillar that is greater than a rigidity of the flexible pillar in shear along a transverse axis of the flexible pillar, the flexible pillar making it possible to obtain a support having a longitudinal direction and able to transmit forces between its ends without, or with little, deformation longitudinally and to be easily deformed in a transverse direction.

9 Claims, 5 Drawing Sheets

(56) References Cited

U.S. PATENT DOCUMENTS

| | | | |
|---|---|---|---|
| 7,931,240 B2* | 4/2011 | Kothera | B63B 1/248 244/99.2 |
| 8,056,865 B2* | 11/2011 | Grip | B64C 9/16 244/219 |
| 8,678,324 B2* | 3/2014 | Hemmelgarn | F03D 1/0675 416/240 |
| 2007/0152106 A9 | 7/2007 | Perez-Sanchez | |
| 2010/0259046 A1 | 10/2010 | Kota et al. | |
| 2011/0186690 A1* | 8/2011 | Stewart | B64C 9/02 277/654 |
| 2014/0302261 A1 | 10/2014 | Cheung et al. | |
| 2019/0061910 A1* | 2/2019 | Kota | B64C 3/48 |
| 2021/0114711 A1* | 4/2021 | Barnett | B29C 70/222 |

OTHER PUBLICATIONS

French Search Report for Application No. 2112448 dated Jun. 9, 2022.

* cited by examiner

FLEXIBLE PILLAR FOR A FLEXIBLE FRAME OF A VARIABLE GEOMETRY FLIGHT CONTROL SURFACE

TECHNICAL FIELD

The disclosure herein concerns a flexible pillar for a flexible frame intended in particular to be disposed in a variable geometry flight control surface, for example a deformable aileron of an aircraft.

BACKGROUND

In aeronautics mobile surfaces are used, generally on the wings and on the tail of an aircraft, to vary lift and drag. In particular, ailerons are aerodynamic flight control surfaces situated at the trailing edge of the wings of an aircraft. They are pivoted relative to the wings in such a manner at to be able to be moved in rotation and thus to vary the exposure of their exterior surfaces to the airflow. For example, the ailerons of the two wings are generally moved in opposite directions (one is pivoted up and the other down) to produce a roll movement.

To this end, it is known to use rigid flight control surfaces that are caused to pivot about their rotation axis by an actuator in order to cause them to assume required positions. Their rigidity in particular enables the flight control surfaces to withstand aerodynamic forces to which they are destined to be subjected.

However, flight control surfaces of this kind can be difficult and costly to provide. Another solution consists in using deformable flight control surfaces, that is to say flight control surfaces the movement of which is achieved by the deformation of at least a part of their structure by an actuator. Nevertheless, existing structures do not make it possible to obtain flight control surfaces that are both easily deformable and sufficiently rigid to support high aerodynamic forces.

These solutions are therefore not entirely satisfactory.

SUMMARY

An object of the disclosure herein is a solution enabling the aforementioned disadvantage to be remedied.

To this end it concerns a flexible pillar for a flexible frame intended to be disposed on a variable geometry flight control surface having an upper skin and a lower skin.

In accordance with the disclosure herein, the flexible pillar includes at least one elastic element having an elongate shape in the direction of a longitudinal axis. The flexible pillar is configured to be disposed between the upper skin and the lower skin so that the elastic element can be fixed to the upper skin at a first end of the flexible pillar and can be fixed to the lower skin at a second end of the flexible pillar. The flexible pillar has a compressive and a tensile rigidity along the longitudinal axis (X-X) that is greater than a shear rigidity of the flexible pillar along a transverse axis (Y-Y) of the flexible pillar (1).

Thus, thanks to the disclosure herein, a support is obtained that has a longitudinal direction and is able to transmit forces between its ends in that longitudinal direction and of doing this by deforming relatively little in that longitudinal direction and being able to deform easily in a direction transverse to the longitudinal direction.

The elastic element of the flexible pillar advantageously comprises at least a first elastic segment at its first end, a second elastic segment at its second end and a rigid core disposed between the first elastic segment and the second elastic segment.

Moreover, at least the first elastic segment and/or the second elastic segment is or are constituted of an incompressible elastic material.

Moreover, at least the first elastic segment and/or the second elastic segment comprises at least two elastic sections and at least one metal plate that are stacked along the longitudinal axis, the metal plate or plates being interleaved between two elastic sections.

In a preferred embodiment the flexible pillar has a cross-section of square shape.

In one particular embodiment the flexible pillar has a cross-section of rectangular shape with a length intended to extend in the direction of a span of the variable geometry flight control surface in which it is intended to be fixed.

The disclosure herein also concerns a frame for a variable geometry flight control surface.

In accordance with the disclosure herein, the flexible frame includes a plurality of flexible pillars, the plurality of flexible pillars being intended to be regularly distributed in an internal space of the variable geometry flight control surface, the internal space being delimited by the upper skin and the lower skin.

Moreover, the rigid core of each of the flexible pillars advantageously occupies a distance along the longitudinal axis between the first elastic segment and the second elastic segment if the first elastic segment and the second elastic segment are separated by a non-zero distance.

The disclosure herein further concerns a variable geometry flight control surface with an upper skin and a lower skin intended to be disposed on a wing of an aircraft. In accordance with the disclosure herein, the variable geometry flight control surface includes a flexible frame disposed between the upper skin and the lower skin.

The disclosure herein further concerns an aircraft equipped with at least one variable geometry flight control surface on at least one of its wings.

BRIEF DESCRIPTION OF THE DRAWINGS

The appended figures will clearly show how the disclosure herein may be reduced to practice. In those figures identical references designate similar elements.

DETAILED DESCRIPTION

Figure 1:
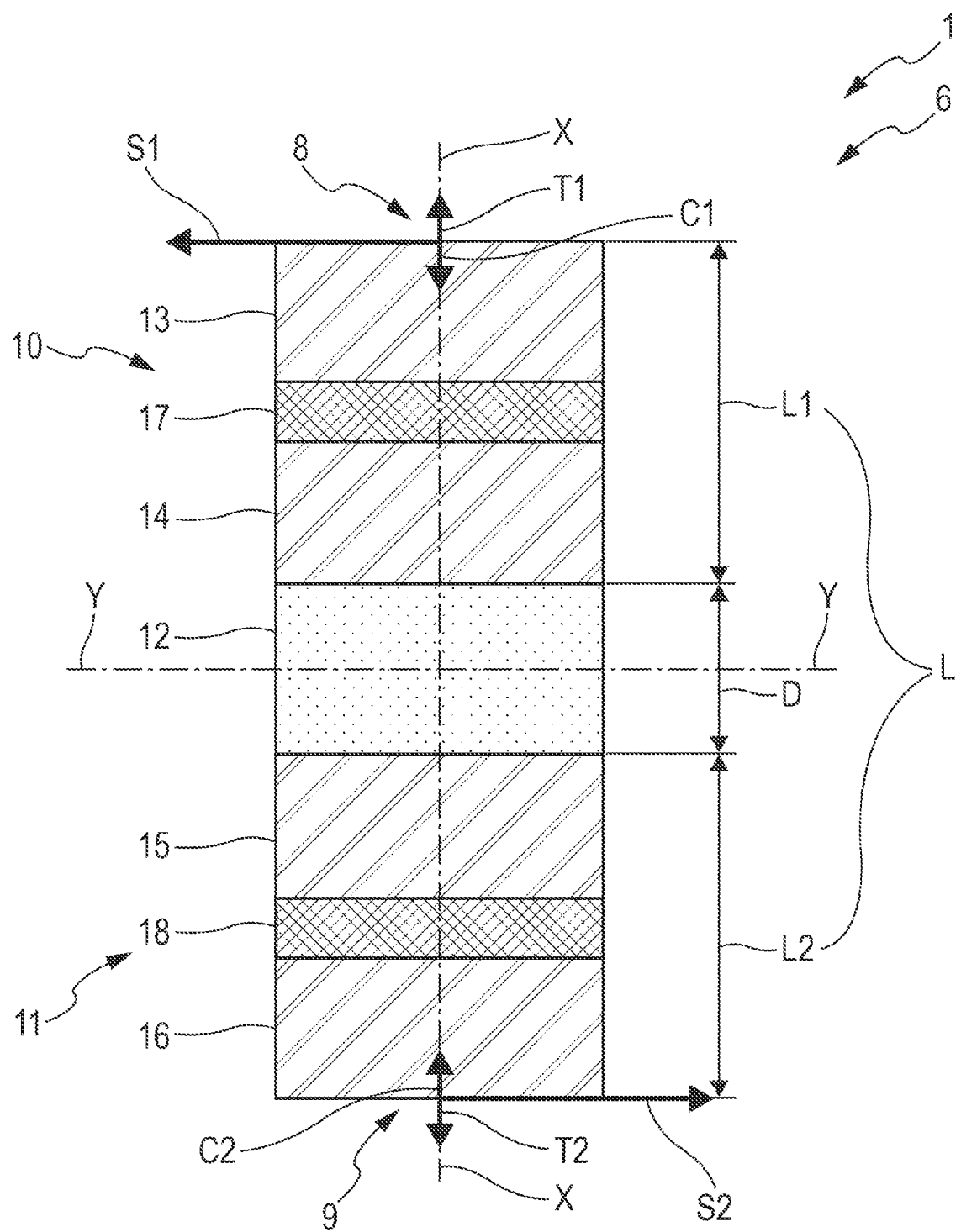
FIG. 1 is a view in longitudinal section of a flexible pillar in a preferred embodiment.
Figure 2:
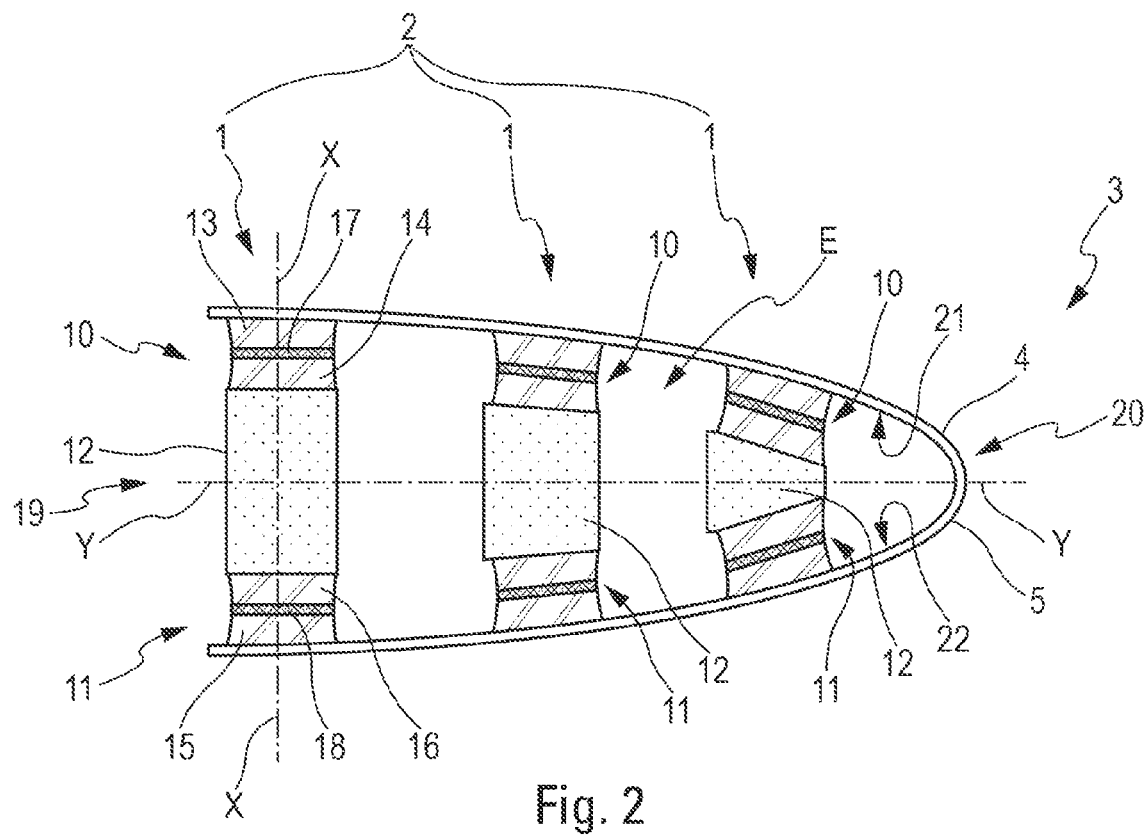
FIG. 2 is a view in cross-section of a variable geometry flight control surface including a flexible frame in accordance with one particular embodiment.
Figure 3:
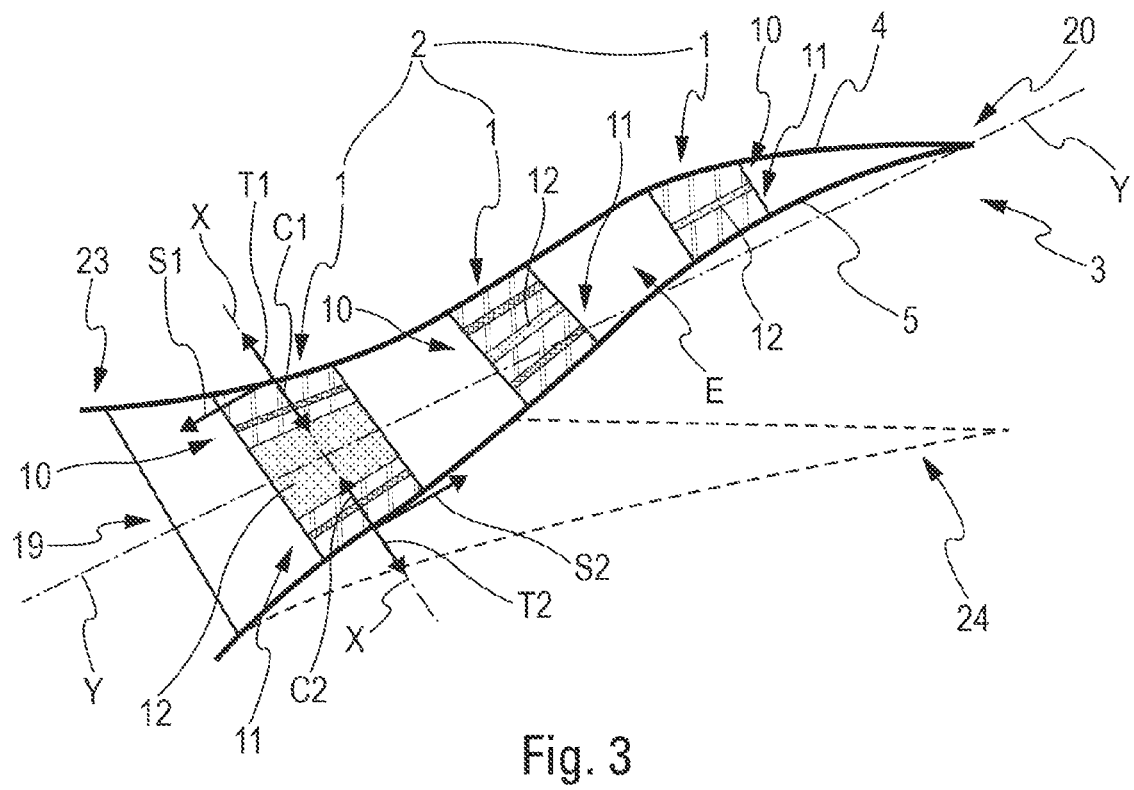
FIG. 3 is a view in cross-section of a flight control surface showing one example of deformation of a variable geometry control surface including a flexible frame in accordance with one particular embodiment.
Figure 4:
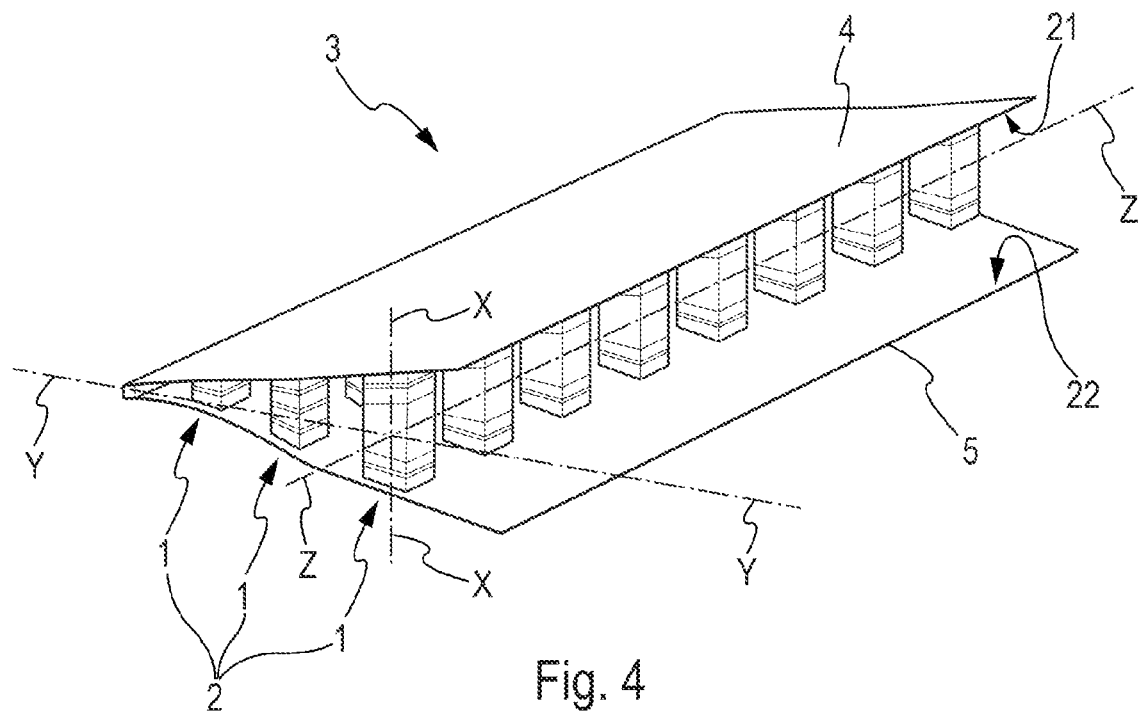
FIG. 4 is a perspective view of a variable geometry flight control surface including a flexible frame in accordance with an embodiment.

The flexible pillar 1 in accordance with the disclosure herein and one embodiment of which is represented diagrammatically in FIG. 1 is a pillar intended to form part of a flexible frame 2 for a variable geometry flight control surface 3 (FIG. 2, FIG. 3 and FIG. 4).

By "pillar" is meant a support having a longitudinal axis intended to be disposed between two objects in such a manner as to transmit forces between the objects.

Moreover, "a variable geometry flight control surface" is a mobile aerodynamic element such as a flight control surface of an aircraft (generally situated on the wings), the structure of which is designed to be deformable. It is therefore possible, for example by an actuator, to deform a flight control surface of this kind in such a manner as to vary its form or its orientation. That deformation can in particular replace movement of a normal rigid flight control surface.

In a preferred embodiment the variable geometry flight control surface 3 on which the flexible pillar 1 is intended to be disposed includes an upper skin 4 and a lower skin 5. In this embodiment the flexible pillar 1 represented in FIG. 1 includes at least one elastic element 6 of elongate shape in the direction of a longitudinal axis X-X. The elastic element 6 has at least a first end 8 along the longitudinal axis X-X adapted to be fixed to the upper skin 4 and a second end 9 along the longitudinal axis X-X adapted to be fixed to the lower skin 5.

The ends 8 and 9 of the elastic element 6 may be fixed to the upper skin 4 and to the lower skin 5, respectively, by glue or any other mechanical assembly.

Moreover, the flexible pillar 1 has a compressive and a tensile rigidity along the longitudinal axis X-X that is greater than a shear rigidity of the flexible pillar 1 along a transverse axis Y-Y of the flexible pillar 1. The transverse axis Y-Y may be orthogonal to the longitudinal axis X-X, as in the FIG. 1 example. By "rigidity" is meant the ability of a body to oppose deformation. In other words, the flexible pillar 1 is configured to deform relatively little when it is loaded in compression or in tension in the direction of the longitudinal axis X-X. Moreover, the flexible pillar 1 is also configured to oppose a slight resistance when it is loaded in shear, that is to say when it is subjected to slicing forces, namely forces at least one component of which is substantially orthogonal to the longitudinal axis X-X.

In the FIG. 1 embodiment the flexible pillar 1 is fixed at the ends 8 and 9. Consequently, it is the end surfaces of the flexible pillar 1 at these ends 8 and 9 that are intended to be subjected to exterior mechanical loads, for example during the deformation of the variable geometry flight control surface 3 as described in detail hereinafter.

Accordingly, in this embodiment the flexible pillar 1 may be subjected to exterior mechanical loads inducing forces that are applied at the level of the ends 8 and 9. These exterior mechanical loads to which the flexible pillar 1 is subjected may in particular be broken down into compression, tension and shear forces. The compression forces are oriented along the longitudinal axis X-X in the sense toward the transverse axis Y-Y and diagrammatically represented by arrows C1 and C2 (FIG. 1 and FIG. 3). The tension forces are oriented along the longitudinal axis X-X away from the transverse axis Y-Y and represented by arrows T1 and T2 (FIG. 1 and FIG. 3). The shear forces, or slicing forces, are oriented orthogonally to the longitudinal axis X-X and represented by arrows S1 and S2 (FIG. 1 and FIG. 3).

The elastic element 6 is preferably made of an elastomer-type material. However, it may equally be made of other materials the properties of hyper-elasticity and of quasi-incompressibility of which make it possible to obtain the ratio between the rigidity of the flexible pillar 1 in compression/tension and the shear rigidity as described hereinabove.

In a preferred embodiment represented in FIG. 1 the elastic element 6 of the flexible pillar 1 includes at least an elastic segment 10 and an elastic segment 11. The elastic segment 10 and the elastic segment 11 are arranged so as to be stacked along the longitudinal axis X-X. Moreover, the flexible pillar 1 may include a rigid core 12 disposed between the elastic segment 10 and the elastic segment 11. The elastic segments 10 and 11 and the rigid core 12 are arranged so as to be stacked in the direction of the longitudinal axis X-X. They may be fixed together by fixing means, for example by glue.

Moreover, at least the elastic segment 10 and/or the elastic segment 11 may be constituted of an incompressible elastic material.

The elastic segments 10 and 11 are preferably made of an elastomer-type material. In particular, this may be a material of vulcanized elastomer type. The rigid core 12 is made of a rigid material. For example, it may be made of a carbon composite material or an isotropic material such as a metal or plastic material.

In this embodiment the elastic segments 10 and 11 and the rigid core 12 have elongate rectangular parallelepiped shapes in the direction of the longitudinal axis X-X. In particular, they are configured to be fixed together so that the interfaces between the segments 10 and 11 and the rigid core 12 are orthogonal to the longitudinal axis X-X of the flexible pillar 1. The elastic segments 10 and 11 preferably have the same dimensions. In particular, the elastic segment 10 may have a length L1 along the longitudinal axis X-X that is equal to a length L2 of the elastic segment 11 along the longitudinal axis X-X. Moreover, the elastic segments 10 and 11 may be made of the same material.

In one particular implementation of this embodiment the rigid core 12 and/or the elastic segments 10 and 11 may have six-sided solid shapes the edge surfaces of which are not parallel. The interfaces between the elastic segments 10 and 11 and the rigid core 12 are at an angle to the longitudinal axis X-X that is not a right angle. This makes it possible, for example, to adapt the shape of the flexible pillar 1 to particular configurations of the variable geometry flight control surface 3 on which it is intended to be disposed. For example, in FIG. 2 the two cores 12 on the right of the figure have non-parallel edge surfaces.

In one particular embodiment represented in FIG. 1 the elastic segments 10 and 11 each comprise at least two elastic sections stacked along the longitudinal axis X-X. In particular, the elastic segment 10 includes an elastic section 13 and an elastic section 14. Similarly, the elastic segment 11 includes an elastic section 15 and an elastic section 16. The elastic sections 13, 14, 15 and 16 preferably have the same dimensions. Moreover, the elastic segments 10 and 11 each include at least one metal plate interleaved between their elastic sections. In particular, the elastic segment 10 includes a metal plate 17 interleaved between the elastic sections 13 and 14. Similarly, the elastic segment 11 includes a metal plate 18 interleaved between the elastic sections 15 and 16. The metal plates 17 and 18 preferably have the same dimensions. Moreover, they may be made of the same material, for example of steel.

In one implementation of this embodiment the elastic sections and the metal plates are arranged so as to be stacked along the longitudinal axis X-X so that the interfaces between the elastic sections and the metal plates are orthogonal to the longitudinal axis X-X. This in particular makes it possible to increase the rigidity of the flexible pillar 1 in compression and in tension along its longitudinal axis X-X.

The composition of the elastic segments 10 and 11 as described hereinabove is non-limiting. In fact, they may include a plurality of elastic sections and of metal plates disposed between them in varied manners (interleaved or not, with interfaces orthogonal to the longitudinal axis X-X or not), for example to adjust the rigidity of the flexible pillar 1 in compression and/or in tension to suit particular circumstances.

Figure 5:
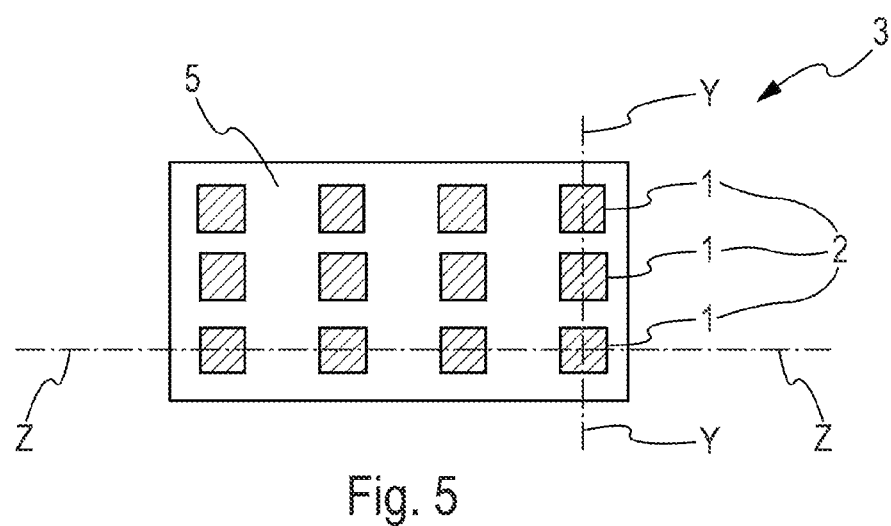
FIG. 5 is a diagrammatic view from above of a distribution of the flexible pillars of a flexible frame in accordance with one embodiment in which the flexible pillars have a cross-section of square shape.

In one embodiment represented in FIG. 1 and FIG. 5 the flexible pillar 1 has a cross-section of square shape. In this embodiment the elastic segments 10 and 11 and the rigid core 12 also have a square cross-section. Thus, the flexible pillar 1 has the shape of a cube or of a rectangular parallelepiped.

Moreover, in this embodiment the lengths L1 and L2 of the elastic segments 10 and 11 are equal. In a non-limiting manner, the elastic sections 13, 14, 15 and 16 may have a thickness, namely a length along the longitudinal axis X-X, between 2 mm and 20 mm inclusive, preferably a thickness of 5 mm. Moreover, the metal plates 17 and 18 may have a thickness between 0.5 mm and 1.5 mm inclusive, preferably a thickness of 1 mm.

Figure 6:
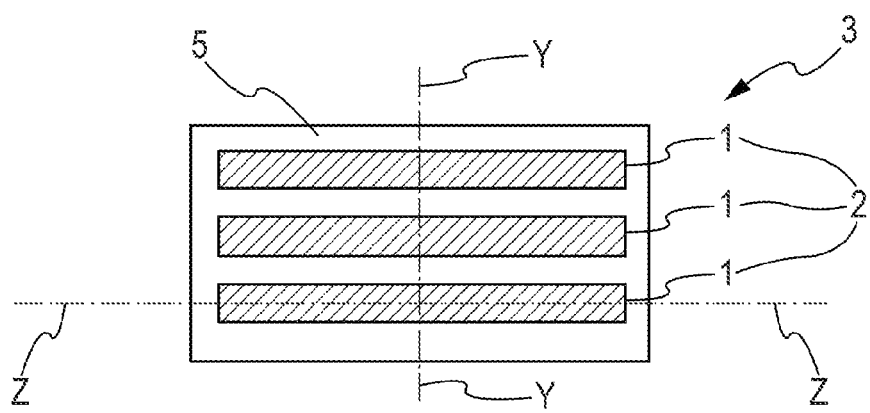
FIG. 6 is a diagrammatic view from above of a distribution of the flexible pillars of a flexible frame in accordance with one embodiment in which the flexible pillars have a cross-section of rectangular shape.

In a particular embodiment represented diagrammatically in FIG. 6 the flexible pillar 1 has a cross-section of rectangular shape. Moreover, the rectangular shape has a length intended to extend over a span of the variable geometry flight control surface 3 in which the flexible pillar 1 is intended to be disposed. In this case the transverse axis Y-Y is oriented substantially perpendicularly to the length of the rectangular cross-section of the flexible pillar 1. The flexible pillar 1 is therefore configured to have a low rigidity in shear (compared to the rigidities in compression and in tension) and thus to be easily deformable in that direction.

However, the shapes described hereinabove for the flexible pillar 1 are non-limiting. In fact, the flexible pillar 1 may have varied and complex shapes, for example with a cross-section the shape of which varies along the flexible pillar 1 along the longitudinal axis X-X.

The flexible pillar 1 as described hereinabove is intended to form part of a flexible frame 2 represented from FIG. 2 to FIG. 6. The flexible frame 2 is for example intended to be disposed on a flight control surface of an aircraft.

In accordance with the disclosure herein the flexible frame 2 includes a plurality of flexible pillars 1. The flexible pillars 1 of the flexible frame 2 are preferably spaced from one another in order to form a regular grid. The flexible frame 2 intended to be disposed in an internal space E of the variable geometry flight control surface 3 delimited by the upper skin 4 and the lower skin 5 is therefore adapted to occupy the internal space E in a homogeneous manner.

However, in particular embodiments the flexible frame 2 may include a plurality of flexible pillars 1 spaced from one another in order to form an irregular grid. In this case the flexible frame 2 is configured to occupy the internal space E in which it is intended to be disposed in a heterogeneous manner, namely with irregular spaces between the flexible pillars 1. This can make it possible to obtain mechanical properties, and in particular elastic properties, that differ from one place to another in the flexible frame 2. For example, this makes it possible to obtain a greater rigidity in zones having a higher density of flexible pillars 1 and conversely to obtain a lesser rigidity in zones having a lower density of flexible pillars 1.

In the embodiment represented in FIG. 2 and in FIG. 4 the flexible frame 2 includes flexible pillars 1 that are identical except for the shape of their rigid core 12. In fact, in this embodiment the frame 2 is intended to be disposed in an internal space E of the variable geometry flight control surface 3 that is wider at a so-called "open" end 19 than at another, so-called "closed" end 20 close to the trailing edge. The length of the flexible pillars 1 along the longitudinal axis X-X must therefore be adapted to suit the shape of the profile of the variable geometry flight control surface 3.

To this end, as represented in FIG. 1 and FIG. 2 the rigid core 12 of each of the flexible pillars 1 occupies a distance D along the longitudinal axis X-X between the elastic segment 10 and the elastic segment 11. In the situation where the distance D separating the elastic segment 10 and the elastic segment 11 is zero, the flexible pillar 1 in question need not include a rigid core 12. Thus, as in the example represented in FIG. 2, all the flexible pillars 1 of the flexible frame 2 have a length L along the longitudinal axis X-X (FIG. 1) corresponding to the length L1 of the elastic segment 10 plus the length L2 of the elastic segment 11, which is the same. In this embodiment only the distance D occupied by the rigid core 12 may vary from one flexible pillar 1 to another.

Moreover, in particular embodiments some flexible pillars 1 of the flexible frame 2 may have a non-completely longitudinal shape, such as the flexible pillar 1 situated toward the edge 20 in the FIG. 2 example. In this case the distance D between the elastic segment 10 and the elastic segment 11 varies in the direction of the transverse axis Y-Y. In order to occupy a distance D of this kind the rigid core 12 may have a shape the length of which along the longitudinal axis X-X also varies in the direction of the transverse axis Y-Y, for example a trapezium shape.

The flexible frame 2 as described hereinabove is intended to be disposed on a flight control surface of an aircraft and especially on a variable geometry flight control surface 3 represented from FIG. 2 to FIG. 6.

The variable geometry flight control surface 3 may have a profiled shape, namely a shape wider at an open end 19, intended to be mounted on a wing 23 of an aircraft AC (FIG. 7), and narrower at a closed end 20 corresponding to the trailing edge of the variable geometry flight control surface 3. Moreover, as explained above, the variable geometry flight control surface 3 may include an upper skin 4 and a lower skin 5 delimiting an internal space E. The upper skin 4 comprises an inner surface 21 oriented toward the lower skin 5 and the lower skin 5 comprises an internal surface 22 oriented toward the upper skin 4. In particular, the upper skin 4 and the lower skin 5 join at the level of the end 20 at the trailing edge of the variable geometry flight control surface 3. The internal space E therefore corresponds to the space between the internal surfaces 21 and 22. This is a closed space at the end 20 and an open space at the end 19.

The variable geometry of the flight control surface 3 includes a flexible frame 2 disposed in the internal space E. In particular, each flexible pillar 1 of the flexible frame 2 is fixed at its ends along the longitudinal axis X-X to the upper skin 4 and to the lower skin 5. To be more precise, each flexible pillar 1 is fixed to the internal surface 21 at its end 8 and to the internal surface 22 at its end 9. The flexible pillars 1 may for example be fixed by glue.

In one embodiment the flexible frame 2 is disposed in the variable geometry flight control surface 3 so that the transverse axis Y-Y of the flexible pillars 1 of the flexible frame 2 corresponds to a direction substantially perpendicular to the trailing edge of the variable geometry flight control surface 3.

Moreover, the flexible frame 2 may be configured so that the distribution of the flexible pillars 1 in the transverse direction Y-Y is regular. Moreover, it may be configured so that the distribution is also regular along a horizontal axis Z-Z corresponding to an axis the direction of which is parallel to the direction of the span of the variable geometry flight control surface 3, namely the direction defined by its greatest length parallel to its trailing edge. For example, the horizontal axis Z-Z corresponds to an axis orthogonal both to the transverse axis Y-Y and to the longitudinal axis X-X, as represented in FIG. 4, FIG. 5 and FIG. 6.

Figure 7:
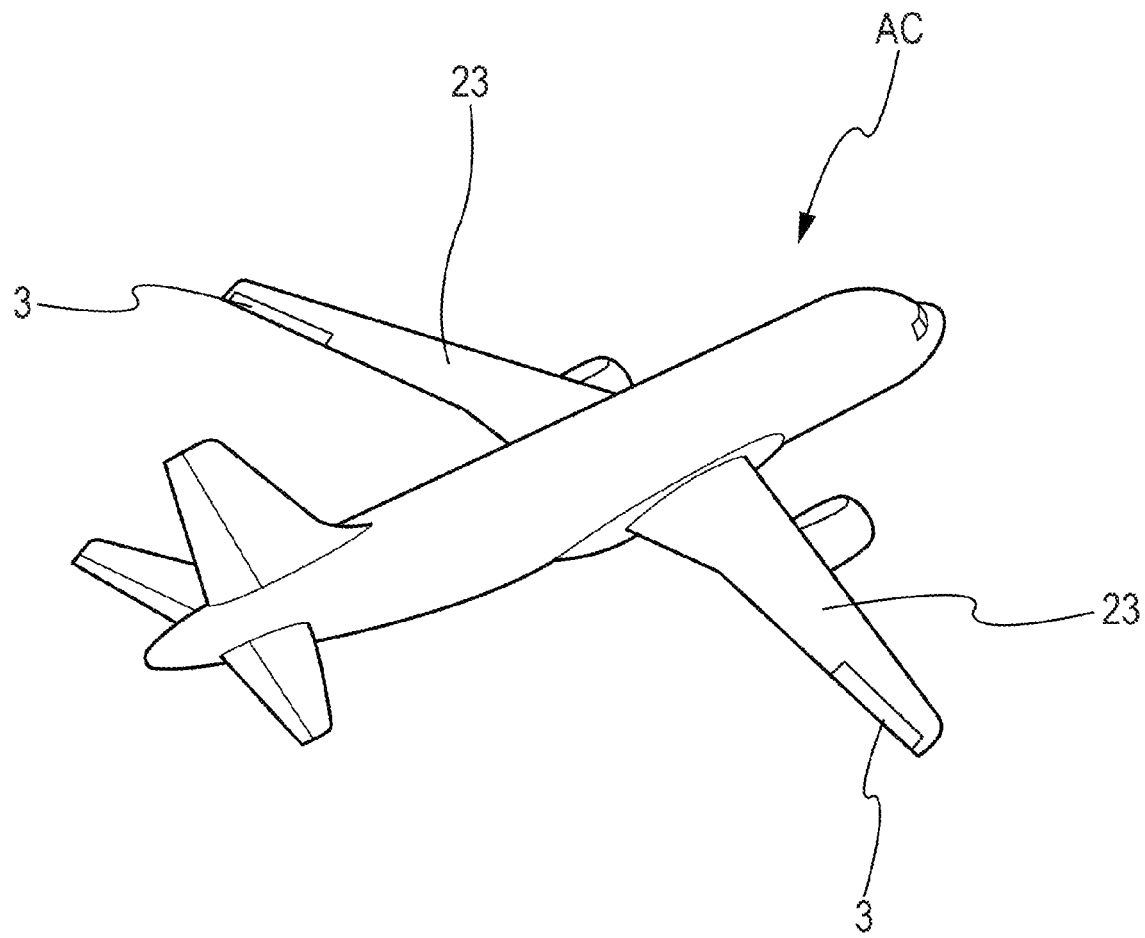
FIG. 7 is a perspective view of an aircraft equipped with variable geometry flight control surfaces on its wings in accordance with an embodiment.

The variable geometry flight control surface 3 may be an aileron intended to equip a wing 23 of an aircraft AC (FIG. 7). In particular, the variable geometry flight control surface 3 is configured so as to be able to be deformed, for example via an actuator, in order to assume different shapes. The deformation of the variable geometry flight control surface 3 corresponds to the deformation of the upper skin 4 and of the lower skin 5 and also of the flexible frame 2, as represented in FIG. 3. In fact, in this example the variable geometry flight control surface 3 has a non-deformed shape diagrammatically represented by the dashed line 24 that is intended to be aligned with and in line with the wing 23 of the aircraft AC. When it is wished to move the variable geometry flight control surface 3 into a required position, it can be deformed, for example by an actuator, in order to cause it to assume a shape that will bring it into the required position. Such deformation is represented by way of non-limiting example in FIG. 3.

To this end, the upper skin 4 and the lower skin 5 are configured to be deformable. They may be made of metal or a composite material. Moreover, the flexible frame 2 is also deformable as described hereinabove. In particular, the rigidity in compression and in tension of the flexible frame 2 (along the longitudinal axis X-X) is such that it allows the upper skin 4 and the lower skin 5 not to be crushed one against the other during deformation stemming from aerodynamic forces. Moreover, the low shear rigidity of the flexible frame 2 (along the transverse axis Y-Y) facilitates the deformation of the upper skin 4 and the lower skin 5.

Moreover, the variable geometry flight control surface 3 is intended to be disposed on an aircraft AC. In particular, the aircraft AC includes two wings 23 having at least one variable geometry flight control surface 3 on each wing 23. The variable geometry flight control surfaces 3 are disposed at the level of the trailing edge of the wings 23, as represented in FIG. 3 and FIG. 7.

The flexible pillar 1 forming part of the flexible frame 2 equipping the variable geometry flight control surfaces 3 as described hereinabove has numerous advantages. In particular:

it makes it possible to obtain a support able to transmit forces between its ends with only very slight deformation along its longitudinal axis while allowing large deformations along the transverse axis;

it makes it possible to obtain a flexible frame 2 that is easily adaptable to suit any type of deformable hollow body having varied shapes, in particular flight control surfaces for aircraft;

it makes it possible to obtain a flexible frame 2 the mechanical, in particular elastic, properties of which are adaptable as a function of the required deformations;

it makes it possible to obtain a flexible frame 2 the elastic properties of which may vary from one place to another of the flexible frame 2, for example by changing the distribution of the flexible pillars 1 or by changing the shape or the composition of the flexible pillars 1.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flexible pillar for a flexible frame of a variable geometry flight control surface that includes an upper skin and a lower skin, the flexible pillar comprising:
at least one elastic element having an elongate shape in a direction of a longitudinal axis of the flexible pillar, wherein the elastic element comprises at least a first elastic segment, a second elastic segment, and a rigid core, wherein the rigid core is disposed between the first elastic segment and the second elastic segment;
wherein the flexible pillar is configured to be disposed between the upper skin and the lower skin, so that the elastic element can be fixed to the upper skin at a first end of the flexible pillar and to the lower skin at a second end of the flexible pillar; and
wherein the flexible pillar has a compressive and a tensile rigidity along the longitudinal axis of the flexible pillar that is greater than a shear rigidity of the flexible pillar along a transverse axis of the flexible pillar.

2. The flexible pillar of claim 1, wherein at least the first elastic segment and/or the second elastic segment is or are constituted of an incompressible elastic material.

3. The flexible pillar of claim 1, wherein at least the first elastic segment and/or the second elastic segment comprises or comprise at least two elastic sections and at least one metal plate stacked along the longitudinal axis, the metal plate or plates being interleaved between two elastic sections.

4. The flexible pillar of claim 1, wherein the flexible pillar has a cross-section of square shape.

5. The flexible pillar of claim 1, wherein the flexible pillar has a cross-section of rectangular shape with a length configured to extend in a direction of a span of the variable geometry flight control surface in which the flexible pillar is configured to be disposed.

6. A flexible frame for a variable geometry flight control surface that includes an upper skin and a lower skin, the flexible frame comprising a plurality of flexible pillars configured to be regularly distributed in an internal space of the variable geometry flight control surface, the internal space being delimited by the upper skin and the lower skin, each respective flexible pillar of the plurality of flexible pillars comprising:
- at least one elastic element having an elongate shape in a direction of a longitudinal axis of the respective flexible pillar, wherein the elastic element comprises at least a first elastic segment, a second elastic segment, and a rigid core, wherein the rigid core is disposed between the first elastic segment and the second elastic segment;
- wherein each flexible pillar is configured to be disposed between the upper skin and the lower skin, so that the elastic element can be fixed to the upper skin at a first end of the flexible pillar and to the lower skin at a second end of the flexible pillar; and
- wherein each flexible pillar has a compressive and a tensile rigidity along the longitudinal axis of the flexible pillar that is greater than a shear rigidity of the flexible pillar along a transverse axis of the respective flexible pillar.

7. The flexible frame of claim 6, wherein the rigid core of each of the plurality of flexible pillars occupies a distance along the longitudinal axis between the first elastic segment and the second elastic segment when the first elastic segment and the second elastic segment are separated by a non-zero distance.

8. A variable geometry flight control surface with an upper skin and a lower skin configured to be disposed on a wing of an aircraft, comprising a flexible frame disposed between the upper skin and the lower skin, wherein the flexible frame comprises a plurality of flexible pillars configured to be regularly distributed in an internal space of the variable geometry flight control surface, the internal space being delimited by the upper skin and the lower skin, each respective flexible pillar of the plurality of flexible pillars comprising:
- at least one elastic element having an elongate shape in a direction of a longitudinal axis of the respective flexible pillar, wherein the elastic element comprises at least a first elastic segment, a second elastic segment, and a rigid core, wherein the rigid core is disposed between the first elastic segment and the second elastic segment;
- wherein each flexible pillar is configured to be disposed between the upper skin and the lower skin, so that the elastic element can be fixed to the upper skin at a first end of the flexible pillar and to the lower skin at a second end of the flexible pillar; and
- wherein each flexible pillar has a compressive and a tensile rigidity along the longitudinal axis of the flexible pillar that is greater than a shear rigidity of the flexible pillar along a transverse axis of the respective flexible pillar.

9. An aircraft comprising at least one variable geometry flight control surface of claim 8 on at least one wing of the aircraft.

* * * * *